United States Patent
Sworowski et al.

(10) Patent No.: US 11,884,339 B2
(45) Date of Patent: Jan. 30, 2024

(54) METHOD FOR OPERATING A STEERING SYSTEM, CONTROL UNIT FOR A STEERING SYSTEM AND STEERING SYSTEM

(71) Applicant: Robert Bosch GmbH, Stuttgart (DE)

(72) Inventors: Eugen Sworowski, Lorch (DE); Andreas Schramm, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 17/295,167

(22) PCT Filed: Dec. 6, 2019

(86) PCT No.: PCT/EP2019/083936
§ 371 (c)(1),
(2) Date: May 19, 2021

(87) PCT Pub. No.: WO2020/120302
PCT Pub. Date: Jun. 18, 2020

(65) Prior Publication Data
US 2022/0017140 A1  Jan. 20, 2022

(30) Foreign Application Priority Data
Dec. 12, 2018 (DE) .................. 10 2018 221 548.0

(51) Int. Cl.
*H02P 21/06* (2016.01)
*B62D 5/04* (2006.01)

(52) U.S. Cl.
CPC ........... *B62D 5/046* (2013.01); *B62D 5/0481* (2013.01)

(58) Field of Classification Search
CPC ......... H02P 21/06; H02P 21/14; B62D 5/046; B62D 5/0481
See application file for complete search history.

(56) References Cited

U.S. PATENT DOCUMENTS

2004/0206571 A1  10/2004  Nishizaki et al.
2009/0009127 A1   1/2009  Imamura et al.
(Continued)

FOREIGN PATENT DOCUMENTS

| CN | 101356721 A | 1/2009 |
| DE | 10 2011 004 384 A1 | 8/2012 |

(Continued)

OTHER PUBLICATIONS

International Search Report corresponding to PCT Application No. PCT/EP2019/083936, dated Mar. 18, 2020 (German and English language document) (5 pages).
(Continued)

*Primary Examiner* — Cortez M Cook
(74) *Attorney, Agent, or Firm* — Maginot, Moore & Beck LLP

(57) ABSTRACT

The disclosure relates to a method for operating a steering system of a motor vehicle. A voltage reserve is determined as a function of a compensation trajectory for a second actuating voltage and as a function of a modulation limit. A first actuating voltage with a fundamental frequency is determined as a function of the voltage reserve. A compensation voltage with a sixth-order harmonic with respect to the fundamental frequency of the first actuating voltage is determined. The second actuating voltage is determined for an inverter as a function of the first actuating voltage and as a function of the compensation voltage.

9 Claims, 6 Drawing Sheets

(56) References Cited

U.S. PATENT DOCUMENTS

| | | | |
|---|---|---|---|
| 2011/0248656 A1* | 10/2011 | Yabuguchi | H02P 21/06 318/400.14 |
| 2011/0298405 A1 | 12/2011 | Costanzo et al. | |
| 2016/0094163 A1 | 3/2016 | Takahashi | |
| 2016/0111986 A1* | 4/2016 | Vollmer | H02P 21/14 318/400.23 |

FOREIGN PATENT DOCUMENTS

| EP | 2 040 368 A1 | 3/2009 |
| EP | 3 104 520 A1 | 12/2016 |
| JP | 2004-23843 A | 1/2004 |
| JP | 2004-328814 A | 11/2004 |
| JP | 2009-17715 A | 1/2009 |
| JP | 2011-66947 A | 3/2011 |
| JP | 2011-147272 A | 7/2011 |

OTHER PUBLICATIONS

A. Schramm et al., Compensation of torque ripples in permanent magnet synchronous machines up to the filed weakening range, 2017 7th International Electric Drives Production Conference (EDPC), 2018, pp. 1-8.

\* cited by examiner

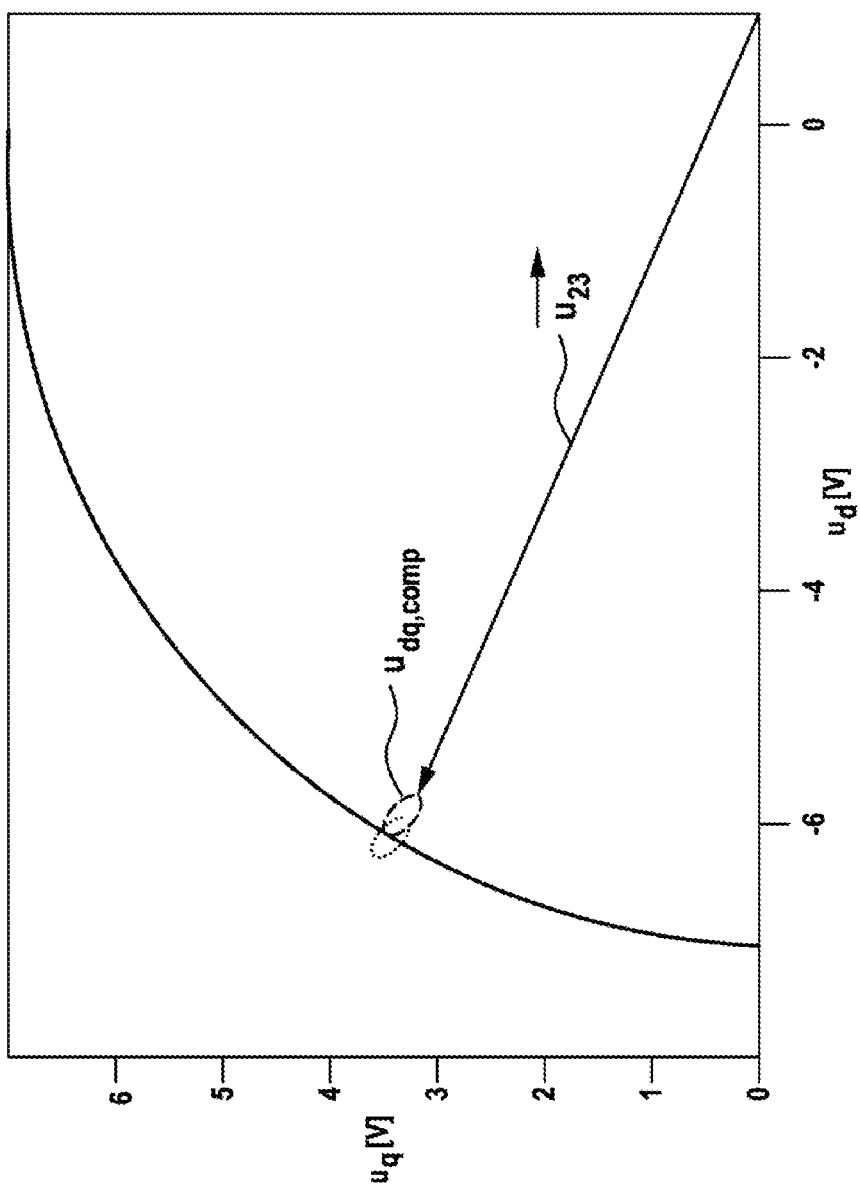

METHOD FOR OPERATING A STEERING SYSTEM, CONTROL UNIT FOR A STEERING SYSTEM AND STEERING SYSTEM

This application is a 35 U.S.C. § 371 National Stage Application of PCT/EP2019/083936, filed on Dec. 6, 2019, which claims the benefit of priority to Serial No. DE 10 2018 221 548.0, filed on Dec. 12, 2018 in Germany, the disclosures of which are incorporated herein by reference in their entirety.

BACKGROUND

The disclosure relates to a method for operating a steering system, a control device for a steering system, and a steering system.

The electric machine employed in the steering system is subject to numerous demands. For reasons of packing, the machine must be as compact as possible. Due to its high power density, the permanently excited synchronous machine (PMSM) has been found to be particularly suitable. Furthermore, the ripple in the torque that is output and the vibrations of the motor housing must be below the acceptable limit values in order to satisfy the requirements for the acoustic behavior.

DE 10 2011 004 384 A1 discloses a drive of an asynchronous motor of a servo steering for a vehicle comprising an apparatus for PWM calculation for the control of an end-stage, an end-stage for the connection of stator windings of the synchronous motor, and a field-oriented regulation, wherein the field-oriented regulation provides a setpoint angle as an output magnitude, wherein the drive has a compensation apparatus whereby a compensation angle can be added to the setpoint angle.

SUMMARY

According to a first aspect, a method for operating a steering system of a vehicle is provided, wherein, in the method, the control device ascertains a voltage reserve depending on a compensation trajectory for a second actuating voltage and depending on a modulation limit, ascertains a first actuating voltage with a fundamental oscillation depending on the voltage reserve, ascertains a compensation voltage with a sixth-order harmonic with respect to the fundamental oscillation of the first actuating voltage, and ascertains the second actuating voltage for an inverter depending on the first actuating voltage and depending on the compensation voltage.

Parasitic effects of a permanently excited synchronous machine result in a torque ripple that depends on the rotor position. In the weak-field region in particular, a dominant sixth-order electrical harmonic comes to the fore. To compensate for this torque harmonic, a voltage reserve is maintained when the permanently excited synchronous machine is operated close to the voltage limit. A manipulation of a current regulation loop thus, for example, takes place by adding a harmonic compensation voltage to the first actuating voltage. The focus is placed on the torque ripple as a source of noticeable acoustic effects. A harmonic machine model calculates the compensation voltage depending on the operating point, which leads to a cancellation of the disturbing torque harmonic. The additional voltage reserve is always required for adding an additional d-component or q-component to the initial voltage vector. The permanently excited synchronous machine can be operated as close as possible to the voltage limit through the proposed control device, and a compensation is ensured at these operating points.

Against the background of the fact that the permanently excited synchronous machine is often operated at the voltage limit, for example during a parking procedure, the solution provided does not just represent a gain in convenience for the driver. Rather does the reduction in noise also entail a reduction in complaints, since the driver less often perceives the noises generated by the synchronous machine as a fault, and will thereby visit the workshop less often.

An integrated method is thus provided, in order to fully compensate the torque ripple in the form of the sixth-order electrical harmonic into the week-field region. In order at the same time to achieve a maximum torque yield, the focus is placed on a maximum utilization of the available modulation voltage, so that, for example, the torque ripple can be compensated for as effectively as possible while utilizing the over-modulation ranges.

One advantageous form of embodiment is characterized in that the modulation limit extends along a circle in a voltage plane. The modulation limit is thus independent of the angle. Advantageously, a second actuating voltage results which extends inside the modulation limit and leads to a complete compensation of the torque ripple when operating the permanently excited synchronous machine close to the voltage limit.

One advantageous form of embodiment is characterized in that the modulation limit extends along a hexagon in a voltage plane. The modulation limit thus depends on the angle. Advantageously, the actuation range of the inverter is thereby fully utilized, and the torque yield is increased with simultaneous compensation for the torque ripple.

One advantageous form of embodiment is characterized in that the angle-dependent voltage reserve is ascertained through a subtraction of a magnitude of the modulation limit from a magnitude of the angle-dependent compensation trajectory. The voltage reserve thus enables the compensation for the torque ripple through the addition of the compensation voltage.

One advantageous form of embodiment is characterized in that the compensation voltage is ascertained by means of a harmonic machine model.

One advantageous form of embodiment is characterized in that the compensation voltage is ascertained depending on an actual rotor position of a permanently excited synchronous machine and depending on the first actuating voltage.

One advantageous form of embodiment is characterized in that the second actuating voltage for the inverter is ascertained through the addition of the first actuating voltage and the compensation voltage.

A second aspect of this description is directed at a control device of a steering system of a motor vehicle, wherein the control device (26) comprises at least one processor and at least one memory with computer program code, wherein the computer program code is configured so that, together with the at least one processor, it has the effect that the control device ascertains a voltage reserve depending on a compensation trajectory for a second actuating voltage and, depending on a modulation limit, ascertains a first actuating voltage with a fundamental oscillation depending on the voltage reserve, ascertains a compensation voltage with a sixth-order harmonic with respect to the fundamental oscillation of the first actuating voltage, and ascertains a second actuating voltage for an inverter depending on the first actuating voltage and depending on the compensation voltage.

A second aspect of this description relates to a steering system of a motor vehicle, wherein the steering system comprises an inverter, a permanently excited synchronous machine, and a control device according to the first aspect.

BRIEF DESCRIPTION OF THE DRAWINGS

Further features and advantages are to be found in the following description of exemplary embodiments. In the figures:

FIGS. 3a, 4a each show a schematic voltage diagram in a dq system; and

DETAILED DESCRIPTION

Figure 1:
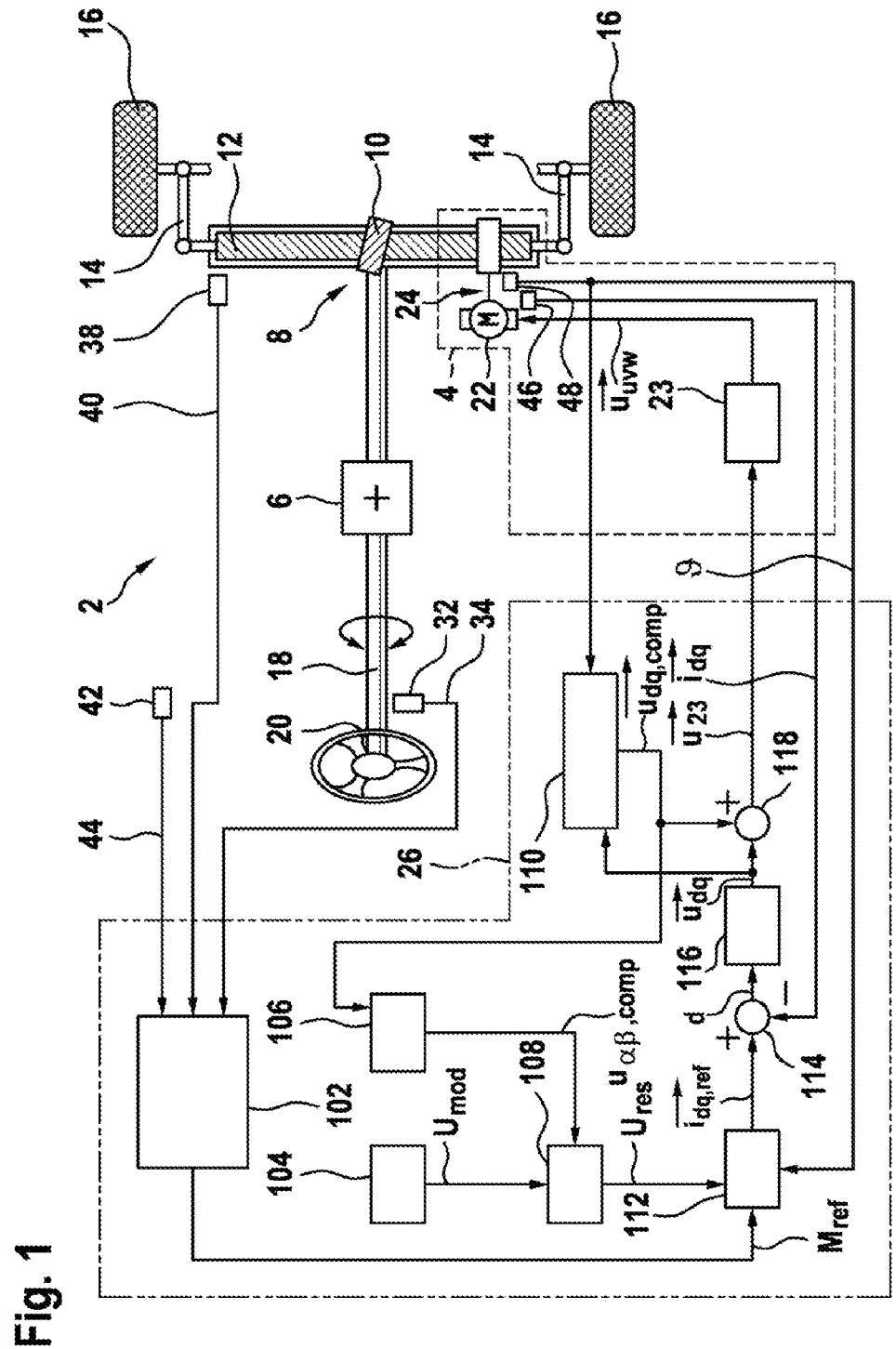
FIG. 1 shows a steering system for a motor vehicle in a schematic form.

FIG. 1 shows, in schematic form, a steering system 2 with power-assisted steering 4. The steering system 2 can, furthermore, as shown, also comprise a superimposed steering system 6. The steering system 2 comprises a steering gear 8 that is, for example, designed as a rack-and-pinion steering system. A rack-and-pinion steering system will predominantly be assumed in this description, in which the steering gear 24 comprises a sprocket 10 and a steering rack 12. The steering gear 8 is connected on each side of the vehicle via the sprocket 10 and the steering rack 12 to a steering linkage 14, each of which acts together with a wheel 16. Fundamentally, the steering system 2 represents one of a large number of possible forms of embodiment of devices suitable for carrying out the method according to the disclosure. Other forms of embodiment can thus be constructed by other steering gears or by a different arrangement of drives. In particular, the steering system 2 is a steer-by-wire steering system in one form of embodiment. Further sensors can, furthermore, be arranged in the steering system, whose arrangement and implementation will not be considered at this point.

A steering means 20 of the steering system, for example a steering wheel, is arranged at a torsion bar 18 of the steering system 2. The steering means angle applied by the vehicle driver can, in a normal operation of the steering system 2, be enlarged or reduced as far as the steering gear 8 by means of the superimposed steering system 6. This steering angle difference, which is introduced into the steering gear 8 by the superimposed steering system 6, is also referred to as the additional steering angle. Instead of a torsion bar 18, a steering column can of course also be arranged between the steering means 20 and the superimposed steering system 6. In this form of embodiment, the torsion bar 18 is arranged between the superimposed steering system 6 and the power-assisted steering 4.

The power assisted steering 4 of the steering system 2 comprises a permanently excited synchronous machine 22, an inverter 23 assigned to the drive unit 22, and a gear 24. The inverter 23 generates a modulated actuating voltage $\vec{u}_{uvw}$ for operating the permanently excited synchronous machine 22. A control device 26 of the steering system is assigned to the permanently excited synchronous machine 22. The permanently excited synchronous machine 22 acts on the steering rack 12 via the gear 24.

A torsion bar torque 34 ascertained by a sensor 32 of the steering system 2 is supplied to a block 102 of the control device 26. The steering system 2 comprises a position sensor 38 that ascertains an actual steering rack position 40 which is supplied to the block 102 of the control device 26. The motor vehicle furthermore comprises a speed sensor 42 that ascertains an actual vehicle speed 44 and supplies this to the control device 26. The actual vehicle speed 44 can, alternatively, also be supplied to the control device 26 by a further control device.

Depending on the supplied torsion bar torque 34, the supplied actual steering rack position 40 and the actual speed 44 of the motor vehicle, the control device 26 ascertains an auxiliary torque Mref that represents a setpoint value for an auxiliary torque to be introduced into the steering system 2 by means of the permanently excited synchronous machine 22, and is, for example, correspondingly converted as an actuating variable, supplied to the permanently excited synchronous machine 22 in the form of the modulated actuating voltage $\vec{u}_{uvw}$.

A sensor 46 of the steering system 2 ascertains an actual stator current $\vec{i}_{dq}$ of the permanently excited synchronous machine 22. The actual stator current $\vec{i}_{dq}$ is, for example, a vectorial variable, and comprises the components id and iq in the iq system. A sensor 48 of the steering system 2 ascertains an actual rotor position $\vartheta$ of the permanently excited synchronous machine 22. A block 104 ascertains a modulation limit $U_{mod}$. A block 106 transforms a compensation trajectory of a supplied compensation voltage $\vec{u}_{dq,comp}$ into a compensation trajectory $\vec{u}_{\alpha\beta,comp}$ fixed with respect to the stator. A trajectory such as one of the compensation trajectories referred to above defines a path curve in a respective coordinate system along which the compensation voltage passes over time. A trajectory such as, for example, the compensation trajectory $u_{\alpha\beta,comp}$, is consequently passed through by means of a vectorial variable such as, for example, a compensation voltage $\vec{u}_{\alpha\beta,comp}$.

A block 108 ascertains a voltage reserve $U_{res}$ depending on the modulation limit $U_{mod}$ and depending on the compensation trajectory $u_{\alpha\beta,comp}$. A block 110 ascertains the compensation voltage $\vec{u}_{dq,comp}$ depending on a first actuating voltage $\vec{u}_{dq}$ and depending on the actual rotor position $\vartheta$. The block 110 comprises, for example, a harmonic machine model, and can be identified as such. The compensation voltage $\vec{u}_{dq,comp}$ emerging from the machine model is defined in the dq system in accordance with equations (1) and (2).

$$u_{d,comp} = U_{d,6} \sin(6\theta_{el} + \varphi_{d,6}) \quad (1)$$

$$u_{q,comp} = U_{q,6} \sin(6\theta_{el} + \varphi_{q,6}) \quad (2)$$

$u_{d,comp}$ is an angle-dependent compensation voltage in the d-direction. $U_{d,6}$ is an amplitude of the compensation voltage $\vec{u}_{dq,comp}$. $\Theta_{el}$ is the electrical rotor position. $\Phi d,6$ is the phase position of the compensation voltage $u_{d,comp}$. Similar considerations apply to $u_{q,comp}$, although in the q-direction.

A block 112 ascertains a setpoint stator current $\vec{i}_{dq,ref}$ with components $i_{d,ref}$ and $i_{q,ref}$ depending on the predetermined auxiliary torque $M_{ref}$, depending on the voltage reserve $U_{res}$ and depending on the actual rotor position $\vartheta$. At an addition point, the control error d is ascertained depending on the setpoint stator current $\vec{i}_{dq,ref}$ and depending on the actual stator current $\vec{i}_{dq}$. A block 116 represents a controller that ascertains the first actuating voltage $\vec{u}_{dq}$ depending on the control error d. At an addition point 118, a second actuating voltage $\vec{u}_{23}$ is ascertained depending on the first actuating voltage $\vec{u}_{dq}$ and depending on the compensation voltage $\vec{u}_{dq,comp}$. The inverter 23 modulates the adjustable voltages in the light of the modulated actuating voltage $u_{uvw}$ in such a way that the stator windings of the permanently excited synchronous machine 22 are adjusted for an effective voltage that corresponds to the second actuating voltage $\vec{u}_{23}$. The first actuating voltage $\vec{u}_{dq}$ is calculated by the controller 116. The second actuating voltage $\vec{u}_{23}$ is supplied to the inverter 32, so that the inverter 23 sets this actuating voltage $\vec{u}_{23}$ at the permanently excited synchronous machine 22 by modulation. The control device 26 consequently provides the second voltage $\vec{u}_{23}$ and passes it to the inverter 23, which drives the permanently excited synchronous machine 22 making use of the second actuating voltage.

A voltage $U_{eff}$ that is available for the development of torque is ascertained in accordance with equation (3), wherein $U_{mod}$ is the modulation limit, where Rs is the stator resistance, where Imax is the maximum current magnitude at a stator winding, and Ures is the voltage reserve.

$$U_{eff} = U_{mod} - R_s I_{max} - U_{res} \quad (3)$$

The calculation of the setpoint stator current $\vec{i}_{dq,ref}$ is performed in accordance with equations (4) to (7), wherein Zp is a number of pole pairs, $\psi_{pm,d}$ is a permanent flux linkage in the d direction, $L_d$, $L_q$ are respective inductances in the d and q directions, $\omega$ is an electrical angular velocity, and $\lambda$ is a Lagrange multiplier.

$$f(i_{d,ref}, i_{q,ref}) = -\frac{3}{2} Z_p(\psi_{pm,d} i_{q,ref} + (L_d - L_q) i_{d,ref} i_{q,ref}) \quad (4)$$

$$\psi_0 = \frac{U_{eff}}{\omega} = \sqrt{(\psi_{pm,d} + L_d i_{d,ref})^2 + L_q^2 i_{q,ref}^2} \quad (5)$$

$$c(i_{d,ref}, i_{q,ref}) = \frac{U_{eff}^2}{\omega^2} - (\psi_{pm,d} + L_d i_{d,ref})^2 - L_q^2 i_{q,ref}^2 \quad (6)$$

$$L = -\frac{3}{2} Z_p \bigg( \psi_{pm,d} i_{q,ref} + (L_d - L_q) i_{d,ref} i_{q,ref} + \lambda \bigg( \frac{U_{eff}^2}{\omega^2} - (\psi_{pm,d} + L_d i_{d,ref})^2 - L_q^2 i_{q,ref}^2 \bigg) \bigg) \quad (7)$$

The setpoint stator current $\vec{i}_{dq,ref}$ is calculated with the aid of the torque equation (4) and of the available voltage $U_{eff}$. The voltage limit is described with the aid of the linked flux $\psi_0$ by equation (5). An optimization problem results from this, with a torque that is to be maximized and the voltage limit as a secondary condition according to equation (6). With the aid of the negative torque equation and the secondary condition, the Lagrange function (7) that is to be minimized can be developed, from which the setpoint stator current $\vec{i}_{dq,ref}$ that is optimum for operation with the components $i_{d,ref}$ and $i_{q,ref}$ according to a respective d and q direction is calculated.

By means of the reference value calculation according to the setpoint stator current $\vec{i}_{dq,ref}$, the fundamental oscillation amplitude udq of the second actuating voltage $\vec{u}_{23}$ is limited in such a way that the addition of the compensation voltage $\vec{u}_{dq,comp}$ is always ensured. The compensation voltage $\vec{u}_{dq,comp}$ is transformed for this purpose according to equation (8) into the $\alpha\beta$ system fixed with respect to the stator according to the compensation voltage $\vec{u}_{\alpha\beta,comp}$.

$$\vec{u}_{\alpha\beta,comp} = \vec{u}_{dq,comp} e^{j\theta_{el}} \quad (8)$$

The compensation voltage $\vec{u}_{dq,comp}$ that is to be added is characterized by its d and q components. Depending on the amplitude and phase of the respective components, corresponding compensation trajectories $u_{dq,comp}$ result. In the general case, the compensation trajectory is described by an ellipse with a variable extent and orientation in the voltage plane. In the extreme case, the ellipse is reduced to a circle or to a straight line.

Through a manipulation in the calculation of the setpoint stator current $\vec{i}_{dq,ref}$ (MMPA/MMPV strategy) it is ensured that a suitable voltage reserve $U_{res}$ is maintained, which allows the required compensation trajectory $u_{dq,comp}$ to be added.

Figure 2A:
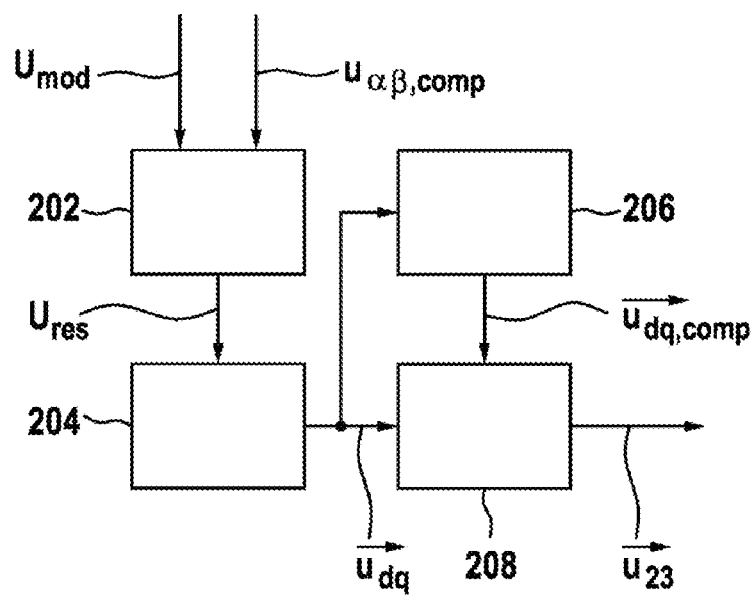
FIG. 2a shows a schematic block diagram.

FIG. 2a shows a schematic block diagram. According to a block 202, the voltage reserve $U_{res}$ is ascertained depending on the compensation trajectory $u_{\alpha\beta,comp}$ for the second actuating voltage $\vec{u}_{23}$ and depending on the modulation limit $U_{mod}$. A block 204 ascertains the first actuating voltage $\vec{u}_{dq}$ with a fundamental oscillation depending on the voltage reserve $U_{res}$. According to a block 206, the field-oriented compensation voltage $\vec{u}_{dq,comp}$ is ascertained with a sixth-order harmonic with respect to the fundamental oscillation of the first actuating voltage $\vec{u}_{dq}$. According to a block 208, the second actuating voltage $\vec{u}_{23}$ for the inverter is ascertained depending on the first actuating voltage $\vec{u}_{dq}$ and depending on the compensation voltage $\vec{u}_{dq,comp}$.

Figure 2B:
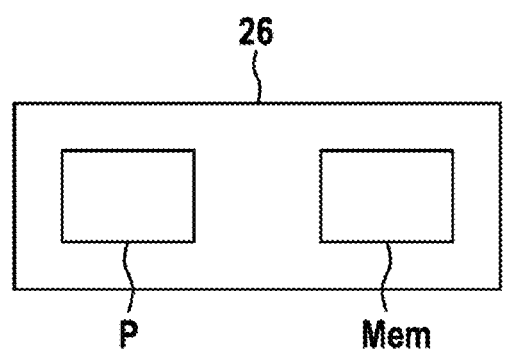
FIG. 2b shows a schematically illustrated control device.

FIG. 2b shows the schematically illustrated control device 26. The control device 26 comprises a processor P that is connected via a data cable to a storage element Mem. The processor P can also be referred to as a digital computing device on which the method described here can be carried out. The memory element Mem can also be referred to as a storage medium. A computer program that can be carried out on the processor P is stored as computer program code on the memory element Mem.

Figure 3B:
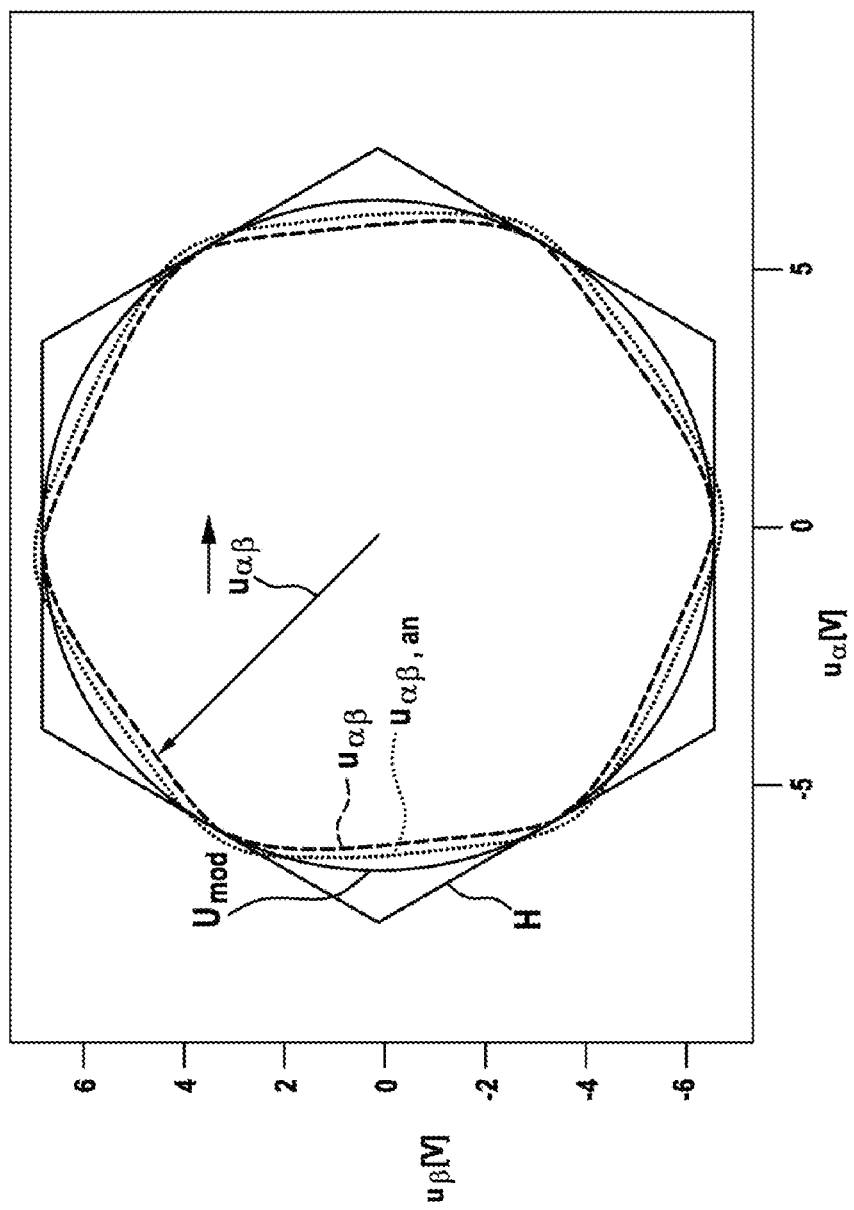
FIGS. 3b, 4b each show a schematic voltage diagram in an αβ system.

FIG. 3a is drawn in the field-oriented dq coordinate system. According to FIGS. 3a and 3b the inner circle of the vector plane is specified with a maximum diameter as the modulation limit $U_{mod}$, which can also be referred to as the angle-independent voltage limit. This modulation limit $U_{mod}$ is defined by equation (9), which is achieved through the application of the vector modulation in the linear modulation range. $U_{dc}$ identifies the battery voltage or the intermediate circuit voltage. The modulation limit $U_{mod}$ in FIG. 3b (stator-oriented coordinate system) is the largest inner circle that can be drawn inside the hexagon.

$$U_{mod} = \frac{U_{dc}}{\sqrt{3}} \quad (9)$$

The modulation voltage that can be set is reduced by the ohmic voltage drop at the stator windings. The compensation is, finally, ensured through the voltage reserve $U_{res}$ that is to be maintained.

The overlaying of a fundamental oscillation component and a compensation component in the form of the compensation voltage $\vec{u}_{\alpha\beta,comp}$ leads to the angle-dependent output trajectory $u_{\alpha\beta}$ for the second actuating voltage $\vec{u}_{23}$, wherein the actuating voltage $\vec{u}_{\alpha\beta}$ that is fixed with respect to the stator extends along the angle-dependent output trajectory $u_{\alpha\beta}$. The actuating voltage $\vec{u}_{\alpha\beta}$ that is fixed with respect to the stator corresponds in a similar manner to equation (8) to the second field-oriented actuating voltage $\vec{u}_{23}$.

For reasons of symmetry it is sufficient in what follows to consider the segment of the vector plane extending from $\vartheta=0°-60°$ in FIG. 3b, where $\vartheta$ identifies the electrical angle of the actuating voltage $\vec{u}_{\alpha\beta}$ that is fixed with respect to the stator. In this region, the difference between the compensation trajectory $u_{\alpha\beta}$ and the modulation limit $U_{mod}$ is calculated in advance in accordance with equation (10) for a defined number of angle values. The electrical angle $\vartheta$ of the actuating voltage $\vec{u}_{\alpha\beta}$ that is fixed with respect to the stator differs from the electrical rotor position $\theta_{el}$ by an offset.

$$u_{res}(\vartheta)=|U_{\alpha\beta}(\vartheta)|-|U_{mod}| \quad (10)$$

The necessary voltage reserve $U_{res}$ that leads to a limitation of the amplitude of the fundamental oscillation finally emerges from the maximum voltage difference max($u_{res}(\vartheta)$). The result of the limitation of the amplitude of the fundamental oscillation is that the output trajectory $u_{\alpha\beta}$ is always located inside the modulation limit $U_{mod}$. With this, a requested output trajectory $u_{\alpha\beta,an}$ that is located outside the hexagon H is scaled into the settable voltage range, so that only the outer points of the output trajectory $u_{\alpha\beta}$ are located at the modulation limit $U_{mod}$. The region inside the hexagon H corresponds to a region that can be set by the inverter 23.

Figure 4A:
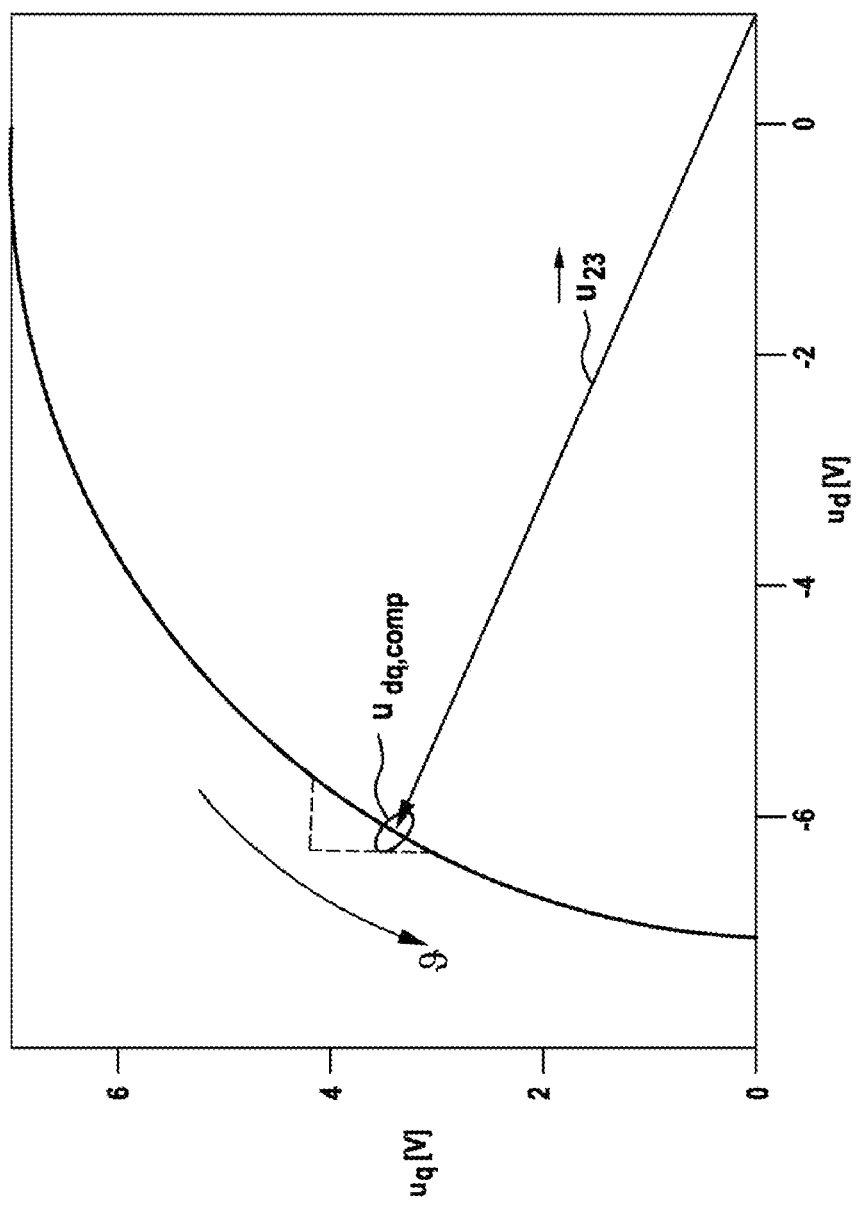
Figure 4B:
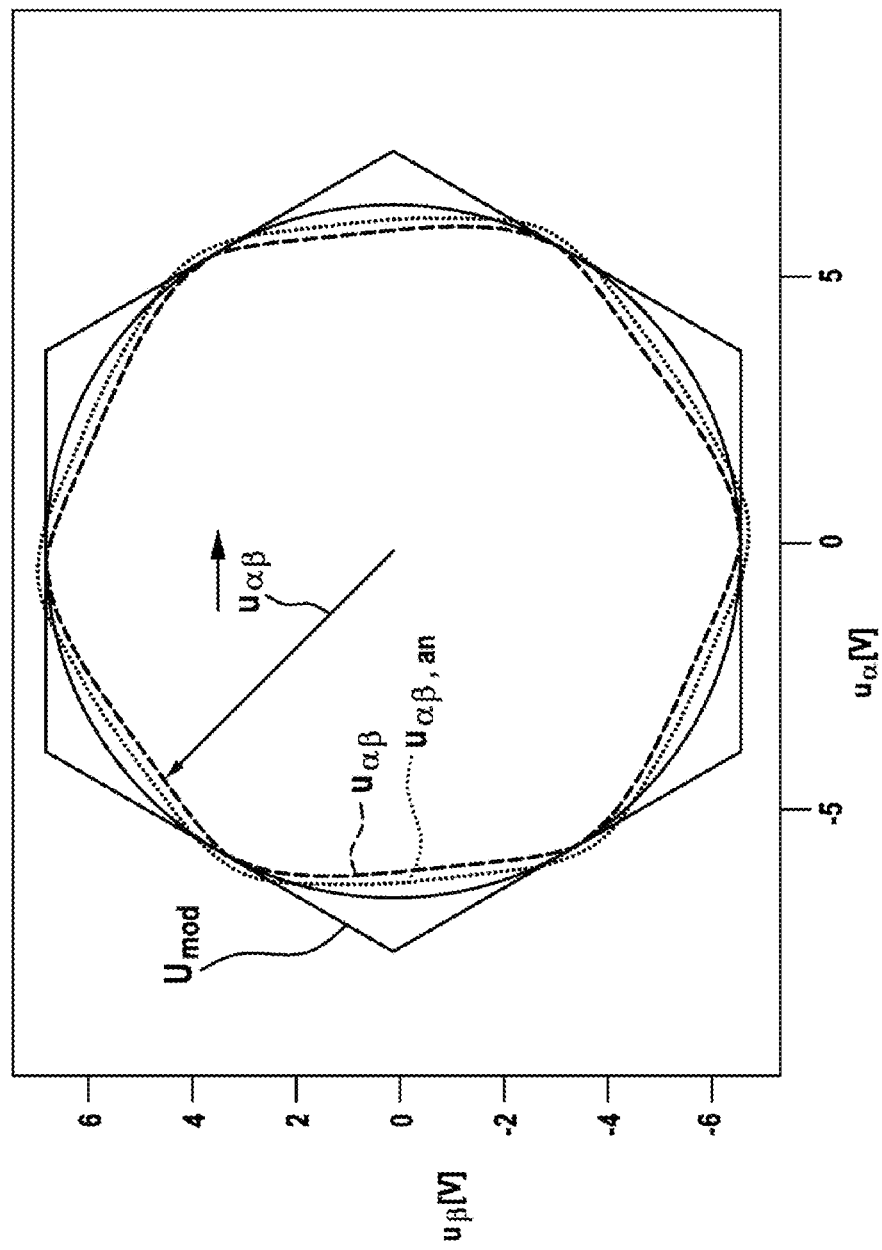

FIGS. 4a and 4b show a further example in which the actuation range of the inverter 23 is fully utilized, and the torque yield thereby increased. By modulating the inverter 23 in the non-linear modulation range, the full, hexagonal voltage area can be set. This over-modulation range, as it is known, in the corners of the vector plane can be employed for the compensation of the sixth electrical order in the torque. The requested elliptical output trajectory $u_{\alpha\beta,an}$ can then be set in accordance with FIG. 4a beyond the linear actuation range. The modulation limit $U_{mod}$ is accordingly defined by an angle-dependent function according to equation (11), which extends along the hexagon.

$$U_{mod}(\vartheta') = \frac{U_{dc}}{\sqrt{3}\left(\sin\left(\frac{\pi}{3}-\vartheta'\right)+\sin(\vartheta')\right)}, \quad (11)$$

$$\text{mit}\vartheta' = \vartheta \bmod \frac{\pi}{3}$$

The output trajectory $u_{\alpha\beta}$ for the second actuating voltage $\vec{u}_{23}$, which is required for the compensation of the torque ripple, is now compared here with the angle-dependent modulation limit $U_{mod}$ at defined angular values over one sixth of the modulation area. The required voltage reserve $U_{res}$ is predicted or ascertained from the maximum magnitude difference according to equation (12).

$$U_{res}=\max(u_{res}(\vartheta))=\max(|U_{\alpha\beta}(\vartheta)|-|U_{mod,max}(\vartheta)|) \quad (12)$$

As can be seen from FIG. 4b, the additional maintenance of a voltage reserve $U_{res}$ is only required when, depending on the angle of the harmonic compensation voltage $\vec{u}_{dq,comp}$, the output trajectory $u_{\alpha\beta}$ lies outside a modulation surface that is defined by the modulation limit $U_{mod}$. Otherwise, the sixth-order electrical harmonic in the torque can be compensated for without additional sacrifice of torque using this method. The proposed method makes it possible to compensate for torque ripple while utilizing the non-linear modulation ranges of the three-phase pulsed inverter (over-modulation).

The invention claimed is:

1. A method for operating a steering system (2) of a motor vehicle, wherein the method comprising:
   determining a voltage reserve based on a compensation trajectory for a second actuating voltage $\vec{u}_{23}$ for an inverter and based on a modulation limit;
   determining a first actuating voltage $\vec{u}_{dq}$ having a fundamental oscillation based on the voltage reserve;
   determining a compensation voltage $\vec{u}_{dq,comp}$ having a sixth-order harmonic with respect to the fundamental oscillation of the first actuating voltage $\vec{u}_{dq}$; and
   determining the second actuating voltage $\vec{u}_{23}$ based on the first actuating voltage $\vec{u}_{dq}$ and based on the compensation voltage $\vec{u}_{dq,comp}$.

2. The method as claimed in claim 1, wherein the modulation limit extends along a circle in a voltage plane.

3. The method as claimed in claim 1, wherein the modulation limit extends along a hexagon in a voltage plane.

4. The method as claimed in claim 1, the determining the compensation voltage further comprising:
   determining the compensation voltage using $\vec{u}_{dq,comp}$ a harmonic machine model.

5. The method as claimed in claim 1, the determining the compensation voltage further comprising:
   determining the compensation voltage based $\vec{u}_{dq,comp}$ on an actual rotor position of a permanently excited synchronous machine and based on the first actuating voltage $\vec{u}_{dq}$.

6. The method as claimed in claim 1, the determining the second actuating voltage further comprising:
   determining the second actuating voltage by adding $\vec{u}_{23}$ the first actuating voltage $\vec{u}_{dq}$ and the compensation voltage $\vec{u}_{dq,comp}$.

7. The method as claimed in claim 1, the determining the voltage reserve further comprising:
   determining the voltage reserve by subtracting a magnitude of the modulation limit from a magnitude of the compensation trajectory,
   wherein the voltage reserve is an angle-dependent voltage reserve and the compensation trajectory is an angle-dependent compensation trajectory.

8. A control device for a steering system of a motor vehicle, the control device comprising:
   at least one memory configured to store computer program code; and
   at least one processor configured to execute the computer program code to:
      determine a voltage reserve based on a compensation trajectory for a second actuating voltage $\vec{u}_{23}$ for an inverter and based on a modulation limit;
      determine a first actuating voltage $\vec{u}_{23}$ having a fundamental oscillation based on the voltage reserve;

determine a compensation voltage $\vec{u}_{dq,comp}$ having a sixth-order harmonic with respect to the fundamental oscillation of the first actuating voltage $\vec{u}_{dq}$; and determine the ascertains a second actuating voltage $\vec{u}_{23}$ based on the first actuating voltage $\vec{u}_{dq}$ and based on the compensation voltage $\vec{u}_{dq,comp}$.

9. A steering system of a motor vehicle, the steering system comprising:

an inverter;

a permanently excited synchronous machine; and a control device having (i) at least one memory configured to store computer program code and (ii) at least one processor configured to execute the computer program code to:

determine a voltage reserve based on a compensation trajectory for a second actuating voltage for an inverter and based on a modulation limit;

determine a first actuating voltage having a fundamental oscillation based on the voltage reserve;

determine a compensation voltage having a sixth-order harmonic with respect to the fundamental oscillation of the first actuating voltage; and determine the second actuating voltage based on the first actuating voltage and based on the compensation voltage.

\* \* \* \* \*

UNITED STATES PATENT AND TRADEMARK OFFICE
CERTIFICATE OF CORRECTION

PATENT NO. : 11,884,339 B2
APPLICATION NO. : 17/295167
DATED : January 30, 2024
INVENTOR(S) : Sworowski et al.

It is certified that error appears in the above-identified patent and that said Letters Patent is hereby corrected as shown below:

In the Claims

In Claim 1, at Column 8, Line 12: "(2)" should be deleted.

In Claim 1, at Column 8, Line 13: "wherein" should be deleted.

In Claim 8, at Column 8, Line 66: "$\vec{u}_{23}$" should read --$\vec{u}_{aq}$--.

In Claim 8, at Column 9, Line 5: "ascertains a" should be deleted.

Signed and Sealed this
Thirtieth Day of July, 2024

Katherine Kelly Vidal
*Director of the United States Patent and Trademark Office*